United States Patent
Johnston et al.

(10) Patent No.: US 7,152,769 B2
(45) Date of Patent: Dec. 26, 2006

(54) CAR TOP SKI/SNOWBOARD CARRIERS

(75) Inventors: Robert Johnston, Portsmouth, NH (US); David M. Moseley, Portsmouth, NH (US)

(73) Assignee: Riverside Cartop Carriers, Inc., Portsmouth, NH (US)

( * ) Notice: Subject to any disclaimer, the term of this patent is extended or adjusted under 35 U.S.C. 154(b) by 307 days.

(21) Appl. No.: 10/693,529

(22) Filed: Oct. 24, 2003

(65) Prior Publication Data

US 2004/0211800 A1   Oct. 28, 2004

Related U.S. Application Data

(60) Provisional application No. 60/421,006, filed on Oct. 24, 2002.

(51) Int. Cl.
*B60R 9/12* (2006.01)
(52) U.S. Cl. .............. 224/324; 224/917.5; 224/325; 211/70.5
(58) Field of Classification Search ............. 224/314, 224/324, 917, 917.5, 279, 309, 42.39
See application file for complete search history.

(56) References Cited

U.S. PATENT DOCUMENTS

| | | | | |
|---|---|---|---|---|
| 3,334,798 A * | 8/1967 | Pezely, Jr. et al. | ......... | 206/594 |
| 3,512,689 A * | 5/1970 | Metropoulos | ............... | 224/314 |
| 3,695,495 A * | 10/1972 | Parsons | ........................ | 224/330 |
| 3,848,785 A | 11/1974 | Bott | ....................... | 224/42.1 F |
| 3,902,641 A | 9/1975 | Peasley | ................... | 224/42.1 B |
| 3,946,917 A | 3/1976 | Crawford et al. | ...... | 224/42.1 R |
| 4,056,220 A * | 11/1977 | Trimble | ...................... | 224/406 |
| 4,326,655 A | 4/1982 | Gradek et al. | ............... | 224/324 |
| 4,402,442 A | 9/1983 | Martino | ....................... | 224/324 |
| 4,497,425 A | 2/1985 | Möbius | ....................... | 224/324 |
| 4,523,704 A | 6/1985 | Washington | ................. | 224/328 |
| 4,655,376 A | 4/1987 | Darling | ........................ | 224/324 |
| 4,735,350 A | 4/1988 | Kamaya | ...................... | 224/315 |
| 5,067,644 A | 11/1991 | Coleman | ..................... | 224/324 |
| 5,702,007 A * | 12/1997 | Fritz et al. | ...................... | 211/17 |
| 5,769,291 A | 6/1998 | Chasan | ......................... | 224/324 |
| 5,860,573 A * | 1/1999 | Hossack et al. | ............ | 224/483 |
| 6,019,265 A * | 2/2000 | Deloza | .......................... | 224/405 |
| 6,164,507 A | 12/2000 | Dean et al. | ................... | 224/324 |
| 6,189,753 B1 | 2/2001 | Kalhok et al. | ............... | 224/406 |
| 6,446,850 B1 * | 9/2002 | Ming-Shun | .................. | 224/324 |
| 6,454,149 B1 * | 9/2002 | Moore | .......................... | 224/405 |
| 6,685,070 B1 * | 2/2004 | Szigeti | ......................... | 224/321 |
| 2002/0096481 A1 * | 7/2002 | Sutliff | .......................... | 211/70.5 |

* cited by examiner

*Primary Examiner*—Nathan J. Newhouse
*Assistant Examiner*—Justin M. Larson
(74) *Attorney, Agent, or Firm*—Bourque and Associates (57) ABSTRACT

An automobile roof top carrier for securing equipment to an automobile rooftop includes a body made from a resilient material having a plurality of protrusions disposed about a top surface. The protrusions define a support surface for holding the equipment and also define a first and second support channel disposed substantially transverse to the support surface. Optionally, the sides of the body include a third and fourth support channel. One fastener is disposed around part of the carrier through the support channels and over the equipment and secures the equipment to the carrier block. A second fastener is disposed through the first and second support channels and secures the carrier to the vehicle roof. The protrusions prevent the fasteners from sliding relative to the carrier block.

7 Claims, 13 Drawing Sheets

CAR TOP SKI/SNOWBOARD CARRIERS

CROSS-REFERENCE TO RELATED APPLICATIONS

This application is related to and claims the benefit of Provisional U.S. Patent Application No. 60/421,006 titled Cartop Ski/Snowboard Carriers, filed by Johnston et al. on Oct. 24, 2002, and incorporated herein by reference.

TECHNICAL FIELD

The present invention relates to a device for securing an object to the roof of an automobile and more particularly, relates to an easily removable device for the storage and transportation of equipment.

BACKGROUND INFORMATION

Traditional rooftop carriers typically are rigidly secured to the roof or roof rack of an automobile. These known carriers are typically difficult to install, and as a result are generally permanently installed on a single vehicle or are installed for an extended period of time. Moreover, the known rooftop carriers often require the aid or use of more than one person to install them.

Upon the arrival at the desired location, for example a ski resort, a user must remove the equipment from the rooftop carrier. Because the known rooftop carriers are left attached to the automobile, the user must carry all the pieces of the equipment individually (e.g., the skis and poles). As a result, transporting the equipment is difficult since the equipment is in individual pieces and is not in an easily transportable package. Consequently, users of traditional rooftop carriers often must purchase separate equipment transporters or carriers to facilitate moving the equipment from the automobile to the desired location, e.g., from the parking lot to the ski lodge or to the ski slope. Another disadvantage of the known rooftop carriers is that a user must purchase a separate storage device for storing the equipment during the off-season or while not in use.

Accordingly, what is needed is a car top carrier that is easily portable and easily installed on the roof of a car so that the device may be used on multiple vehicles. Once installed, the device should be easy to load and unload equipment. Moreover, the device should be useful for the storage and transportation of the equipment once removed from the automobile while the equipment is not in use.

SUMMARY

The present invention features a carrier including a body of resilient material for the transportation of equipment such as, but not limited to, skis, snow boards, surf boards, water skis, and the like. The bottom surface of the body includes an engaging surface for engaging a vehicle roof on which the carrier is to be mounted.

The top surface includes a plurality of raised protrusions defining a support surface sized and shaped to engage a piece of equipment. According to the preferred embodiment, the support surface further includes a slot disposed substantially perpendicular to the support surface. The slot is sized and shaped to contain at least part of the piece of equipment. The slot optionally includes a cavity disposed at an end opposite the support surface.

The raise protrusions also define a first and at least a second support channel disposed substantially transverse to the support surface. The first and second support channels are sized and shaped to engage a first fastener such as a strap or the like.

At least a portion of a first and at least a second side of the body further includes a third and at least a fourth support channel, respectively. The third and fourth support channel are sized and shaped to engage at least a second fastener such as a strap. In the preferred embodiment, the third and the fourth support channel are aligned with the first and the second support channel.

The bottom surface further includes at least a fifth support channel disposed longitudinally and aligned with the third and fourth support channel. The fifth support channel is sized and shaped to accept the second fastener. In the preferred embodiment, the bottom surface further includes a longitudinally disposed cavity sized and shaped to engage at least part of a roof rack on the vehicle roof.

According to another embodiment, the carrier comprises a body of resilient material and includes a roof engagement surface disposed about at least a portion of a bottom of the body for engaging a vehicle roof on which the carrier is to be mounted. A plurality of raised protrusions disposed about a top of the body define a support surface sized and shaped to engage a piece of equipment. The raised protrusions also define a first and at least a second support channel disposed substantially transverse to the support surface. The first and the second support channel are sized and shaped to engage a first fastener.

The carrier also includes a third and at least a fourth support channel disposed about at least a portion of a first and at least a second side portion of the body, respectively. The third and fourth support channel are sized and shaped to engage at least a second fastener. The second fastener is disposed around at least part of the body through at least the third and the fourth channel and over the piece of equipment such that the second fastener secures the piece of equipment to the carrier. The first fastener is disposed about at least a portion of the top surface of the body through the first and second channel such that the first fastener secures the carrier to the vehicle roof. The protrusions prevent the first fastener from sliding relative to the carrier.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
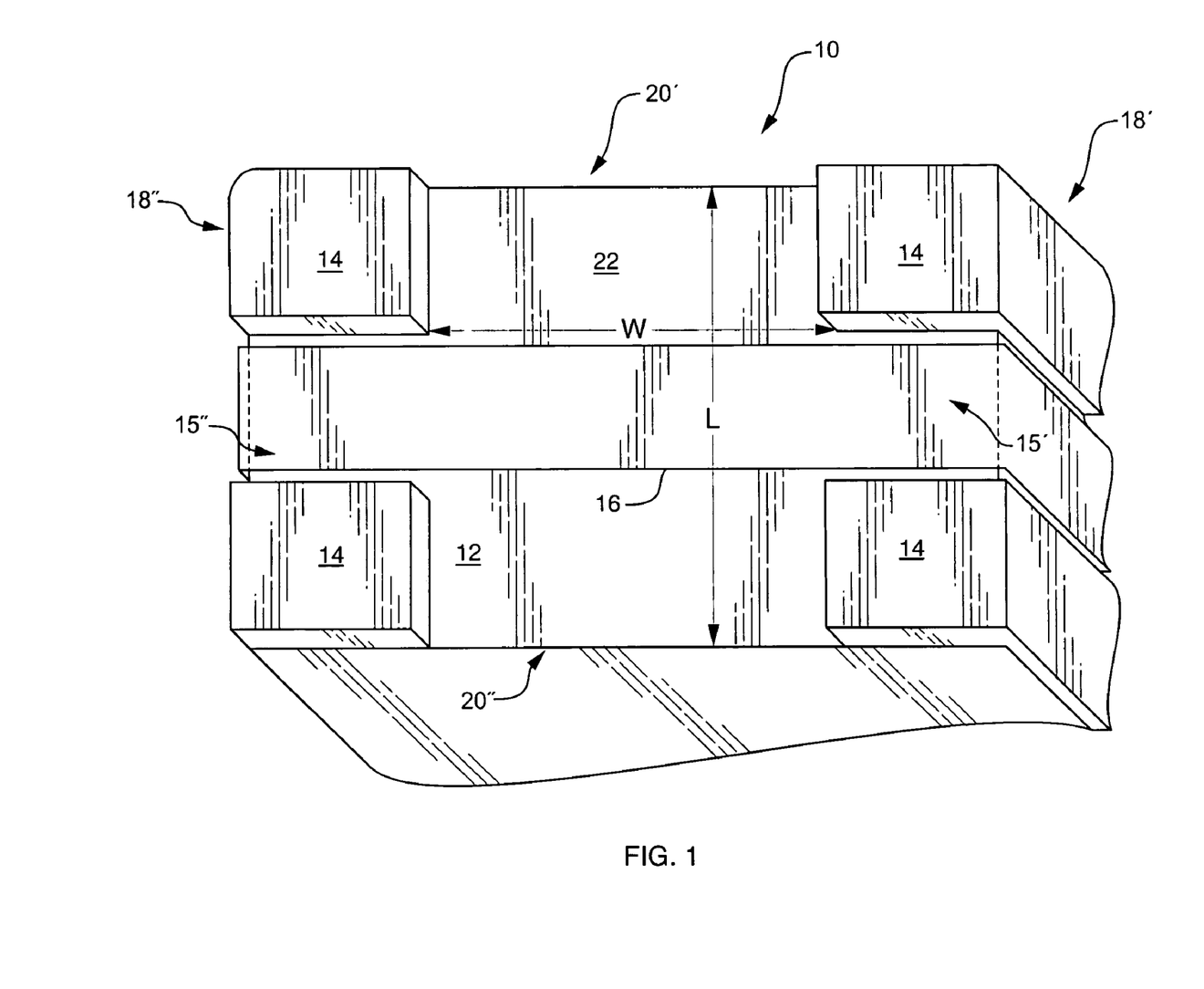
FIG. 1 is an elevated top view of one embodiment according to the present invention.
Figure 4:
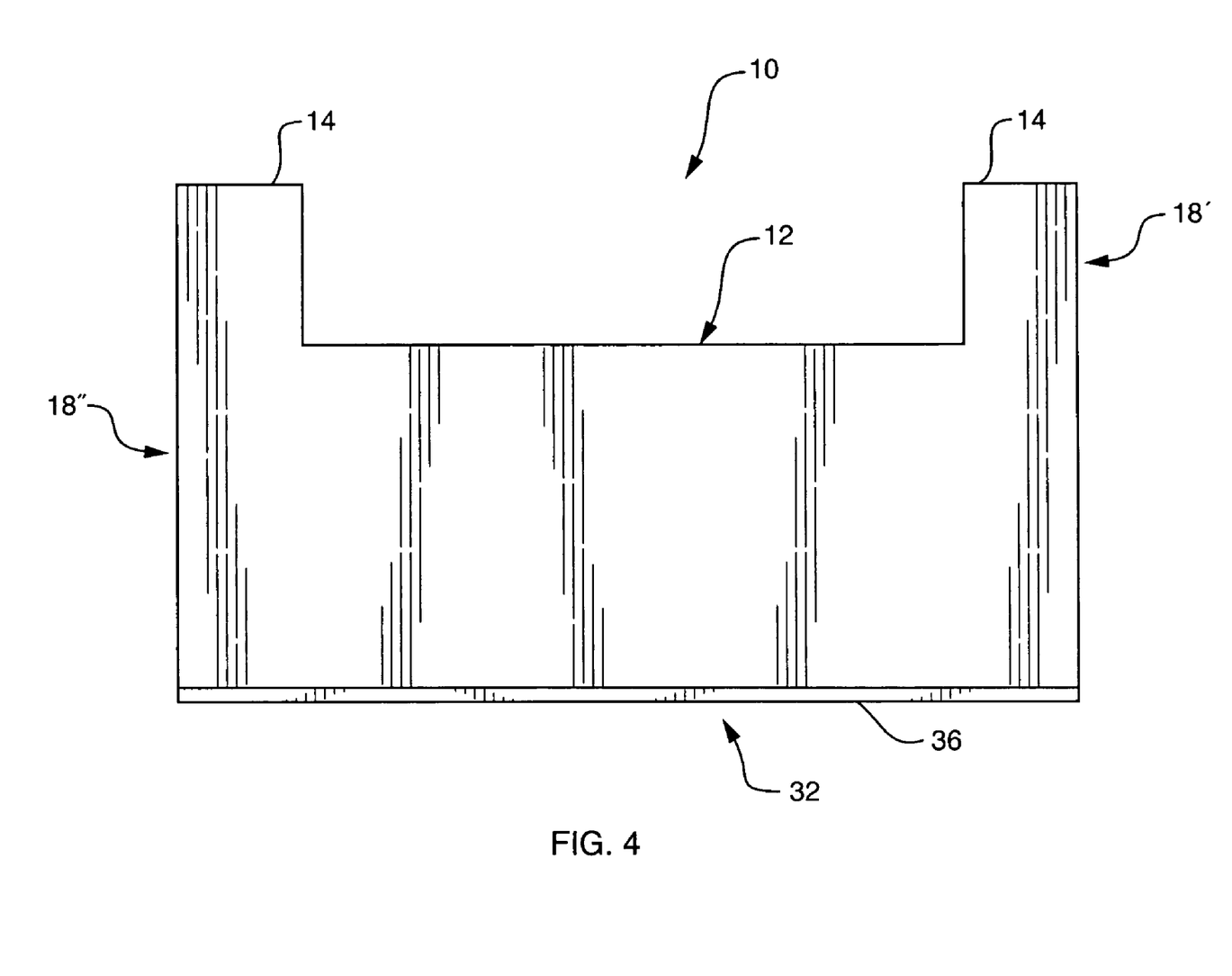
FIG. 4 is a plan side view of one embodiment according to the present invention.

A carrier 10, FIGS. 1 and 4, in accordance with the present invention, allows a user to quickly and easily transport and store equipment, for example sports equipment such as, but not limited to, snow skis, snow boards, surf boards, water skis, and the like. The carrier 10 preferably includes one or more "blocks" made from a soft resilient material such as, but not limited to, mini-cell high-density foam. Other materials, such as other foams, plastics, or synthetics, are also envisioned. The material is preferably weather resistant such that it does not absorb water.

The top 12 of the carrier 10 includes a plurality of towers or protrusions 14. In the preferred embodiment, the top 12 of the carrier 10 includes four towers 14, one at each corner, which provide at least one and preferably first and second support channels 15' and 15" for the straps 16 that secures both the equipment to the carrier 10 as well as the carrier 10 to the automobile (not shown). The straps 16 can be any fastening device known to those skilled in the art such as rope, twine, cable, chain, utility straps, or the like, but are preferably nylon or polypropylene utility straps. The straps 16 also preferably include a buckle, fastener (such as loop/hook fastener) to allow the user to tighten and secure the carrier 10 as will be described in greater detail below.

Figure 7:
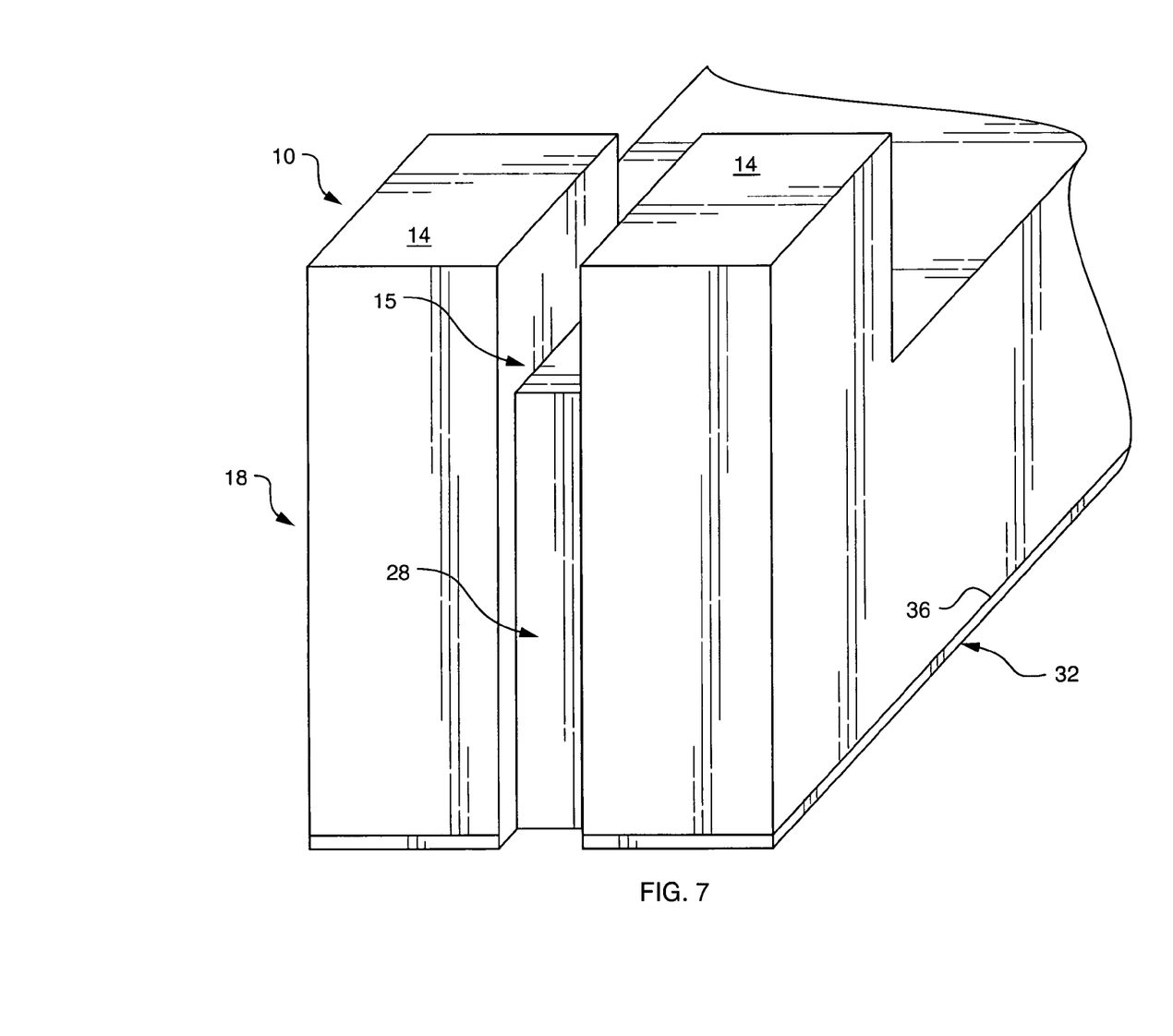
FIG. 7 is a perspective view of an end according to one embodiment of the present invention.
Figure 8:
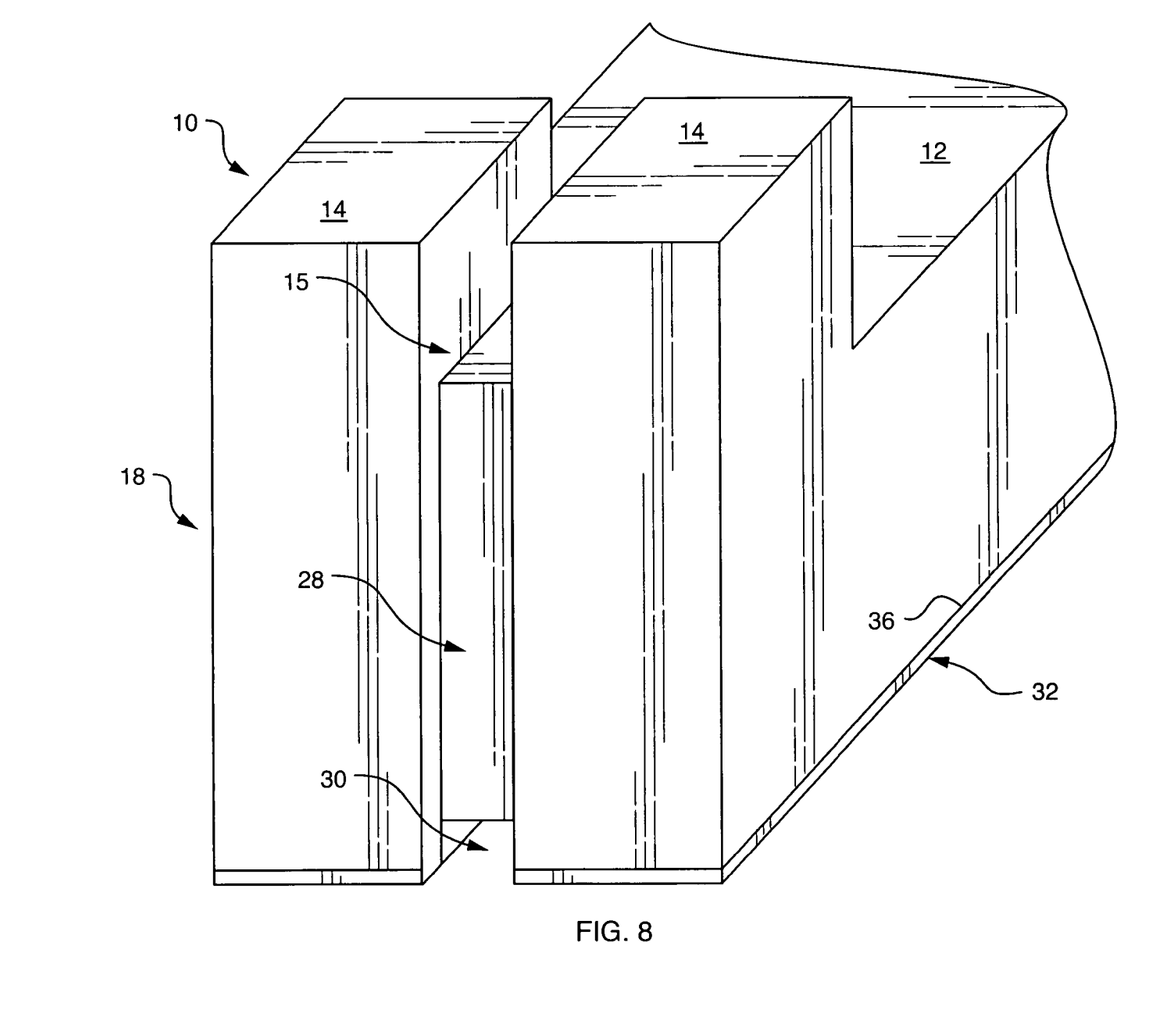
FIG. 8 is a perspective view of the end according to another embodiment of the present invention.

The carrier 10 also preferably includes a third and fourth channels 28, FIG. 7, disposed on the ends 18 which work in conjunction with the channels 15 formed by the towers 14. The channels 15, 28 provide a region or groove for the strap 16 to grip on the carrier 10, thus providing the carrier 10 with additional strength. In a preferred embodiment, the carrier 10 includes a fifth channel 30, FIG. 8 disposed through the bottom 32 of the carrier 10. In this embodiment, a first strap 16' is used to secure the equipment to the carrier and is placed through the first, third, and fifth channels 15, 28, 30. A second strap 16" is then placed around at least the first channel 15 (and possible partly through the second channel 28) and is secured to the automobile as will be described in greater detail below. In this embodiment, the carrier 10 is placed directly on the surface of the roof.

Figure 2:
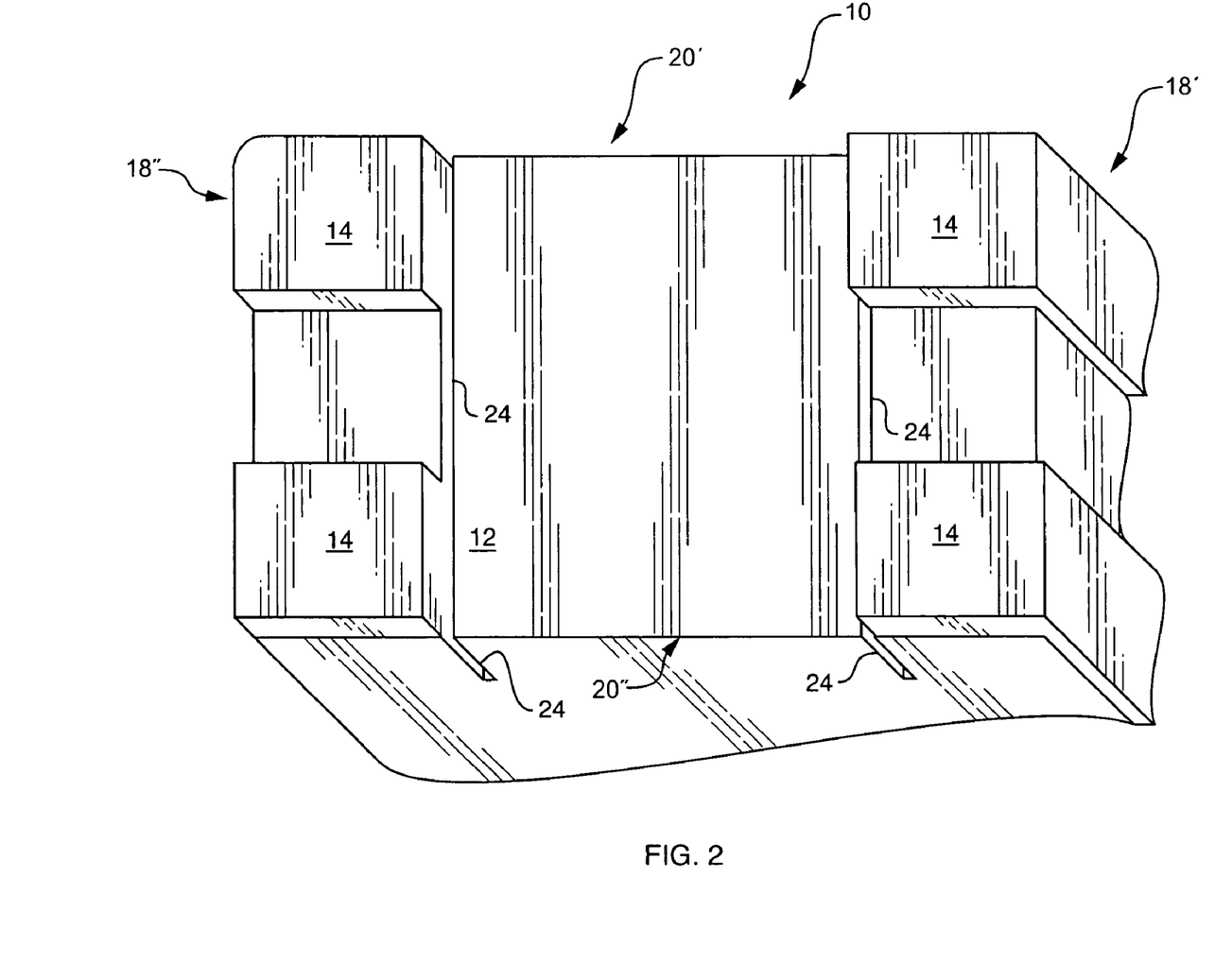
FIG. 2 is a elevated top view of another embodiment according to the present invention.
Figure 3:
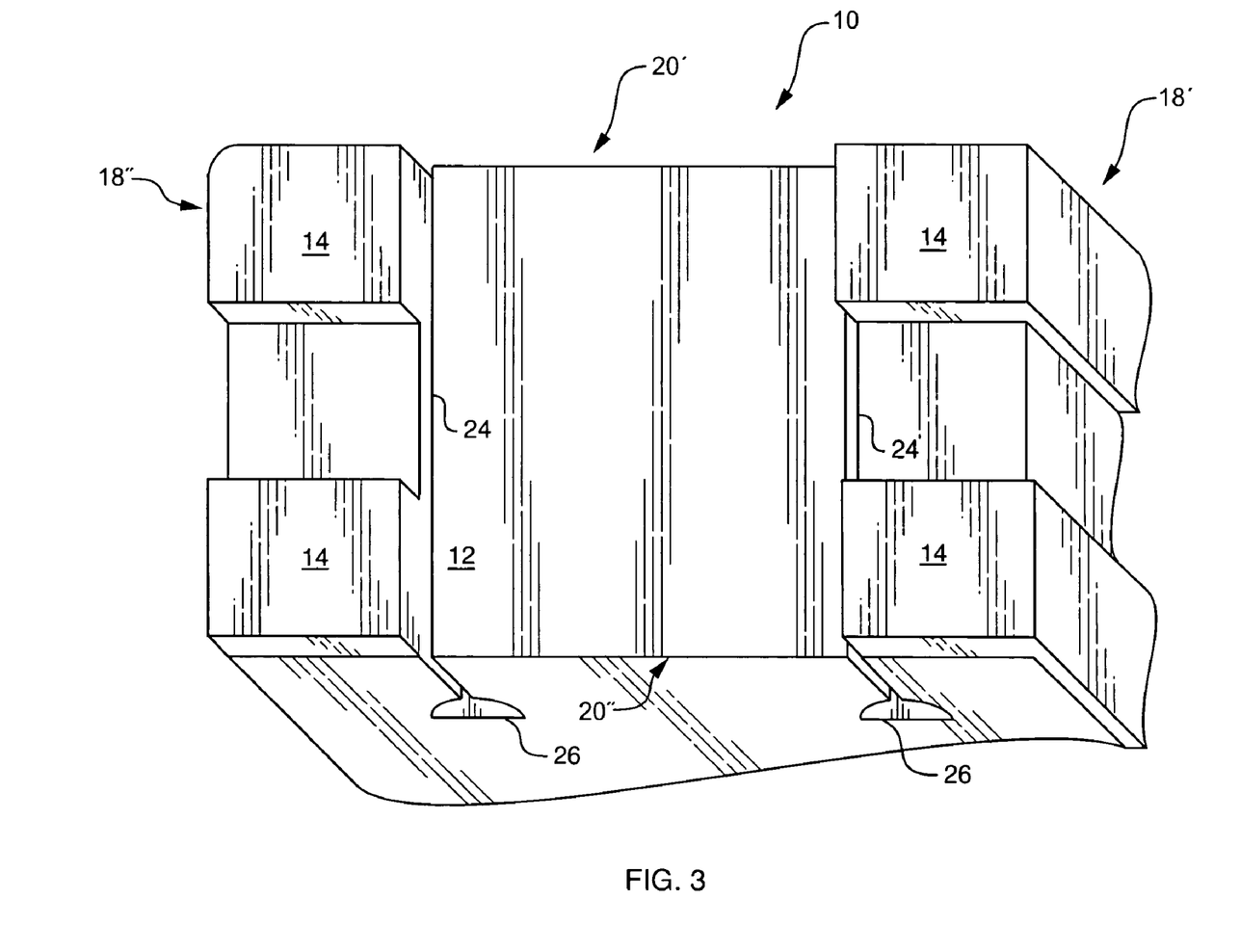
FIG. 3 is yet another elevated top view of yet another embodiment according to the present invention.
Figure 5:
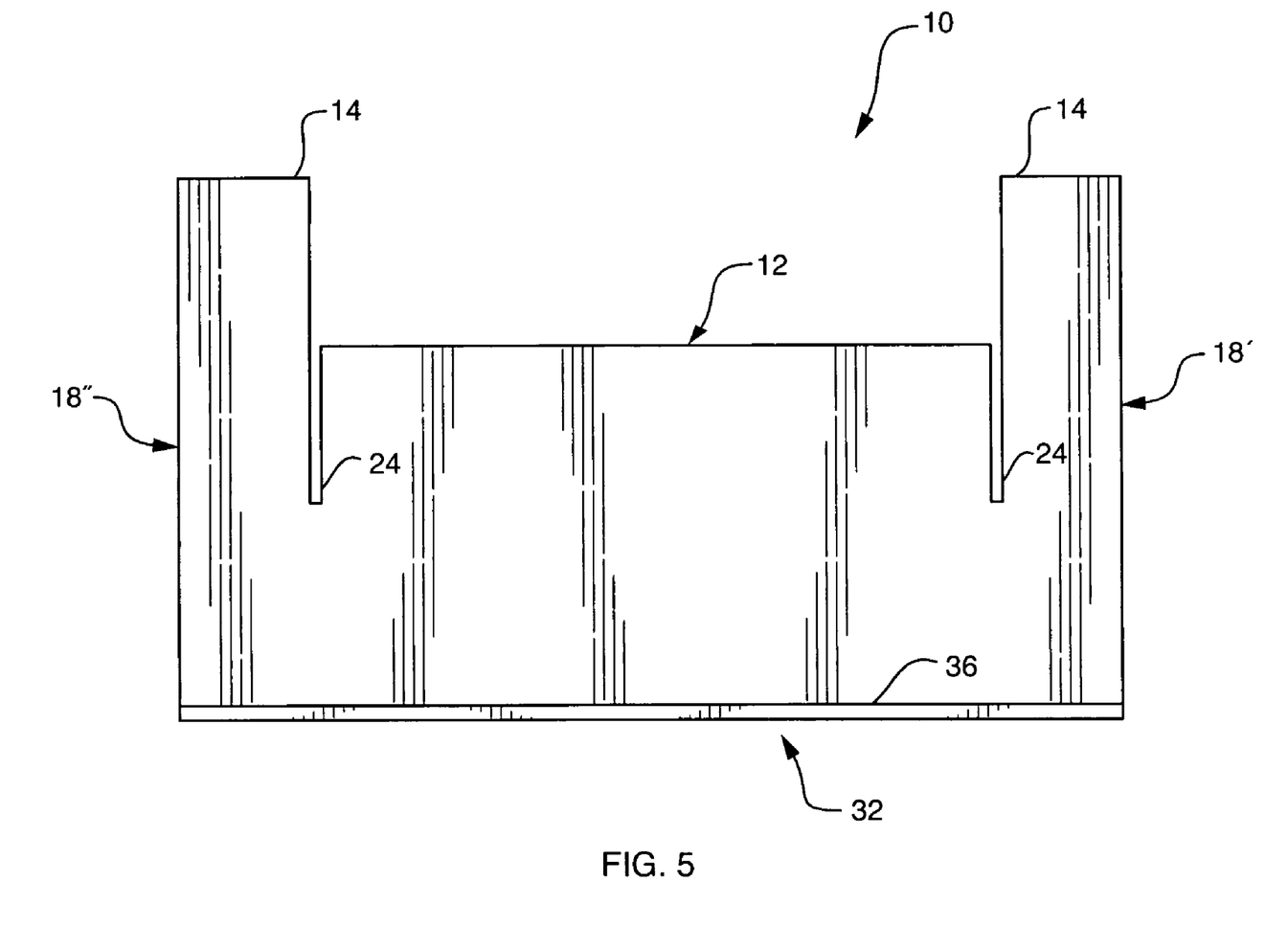
FIG. 5 is a plan view of another embodiment according to the present invention.
Figure 6:
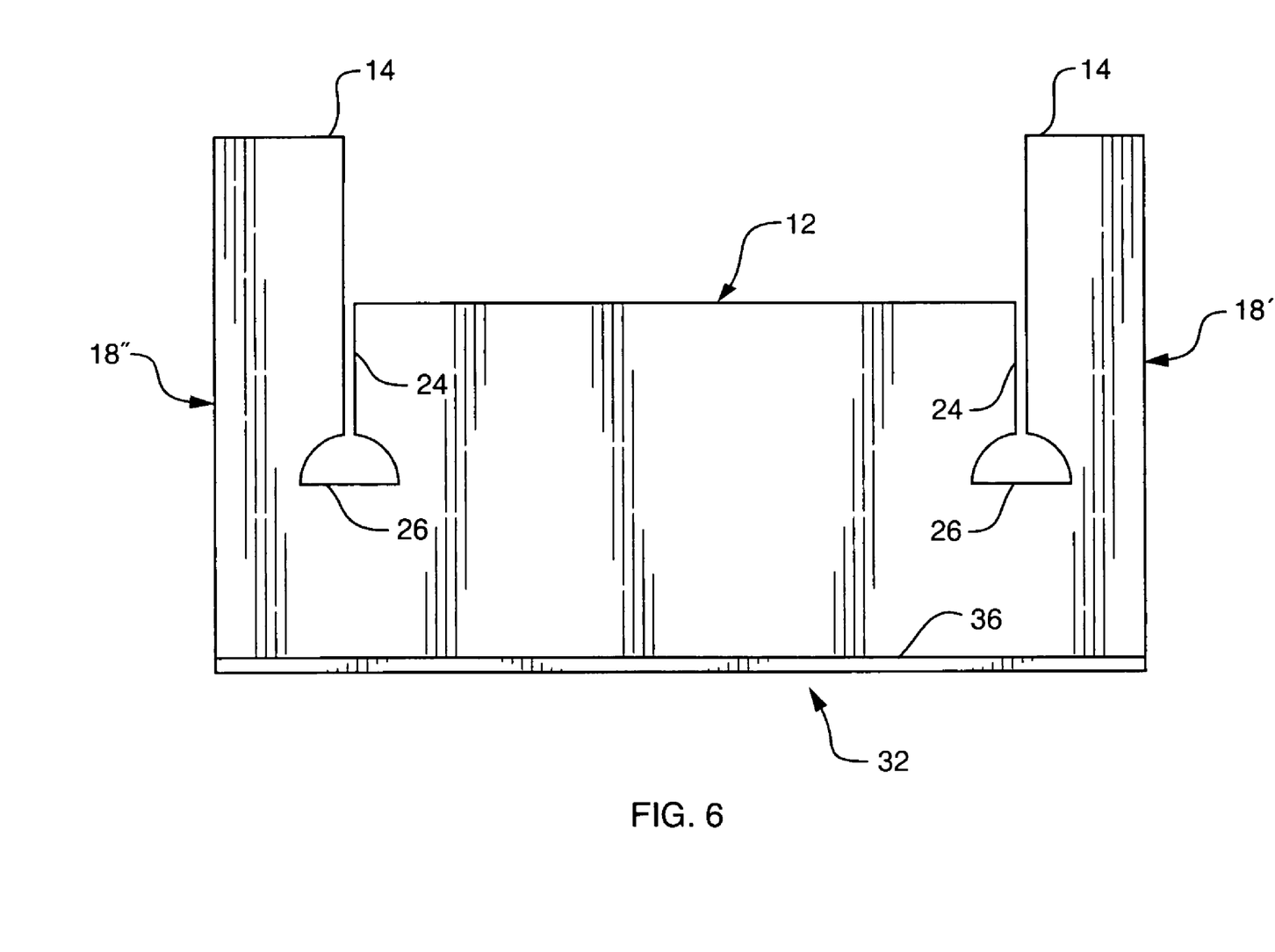
FIG. 6 is a plan view of yet another embodiment of according to present invention.

In another embodiment, the top 12, FIGS. 2 and 5, of the carrier 10 includes at least one, preferably two or more, slots 24. Slots 24 may be vertical (as shown in FIG. 2), diagonal, or may be horizontally disposed through the ends 18 (not shown). Slots 24 are spread apart and securely hold and protect equipment. In a preferred embodiment, the slots 24, FIGS. 3 and 6, further include a cavity 26, such as a radius cut-out or the like, sized to hold a pair of skis and/or poles. The exact size and shape of the cavity 26 will depend on the desired equipment to be stored, and is within the knowledge of one of ordinary skill in the art.

The carrier 10 also preferably includes a second channel 28, FIG. 7, disposed on the ends 18 which works in conjunction with the channel 15 formed by the towers 14. The channels 15, 28 provide a region or groove for the strap 16 to grip on the carrier 10, thus providing the carrier 10 with additional strength. In a preferred embodiment, the carrier 10 includes a third channel 30, FIG. 8 disposed through the bottom 32 of the carrier 10. In this embodiment, a first strap 16' is used to secure the equipment to the carrier and is placed through the first, second, and third channels 15, 28, 30. A second strap 16" is then placed around at least the first channel 15 (and possible partly through the second channel 28) and is secured to the automobile as will be described in greater detail below. In this embodiment, the carrier 10 is placed directly on the surface of the roof.

Figure 9:
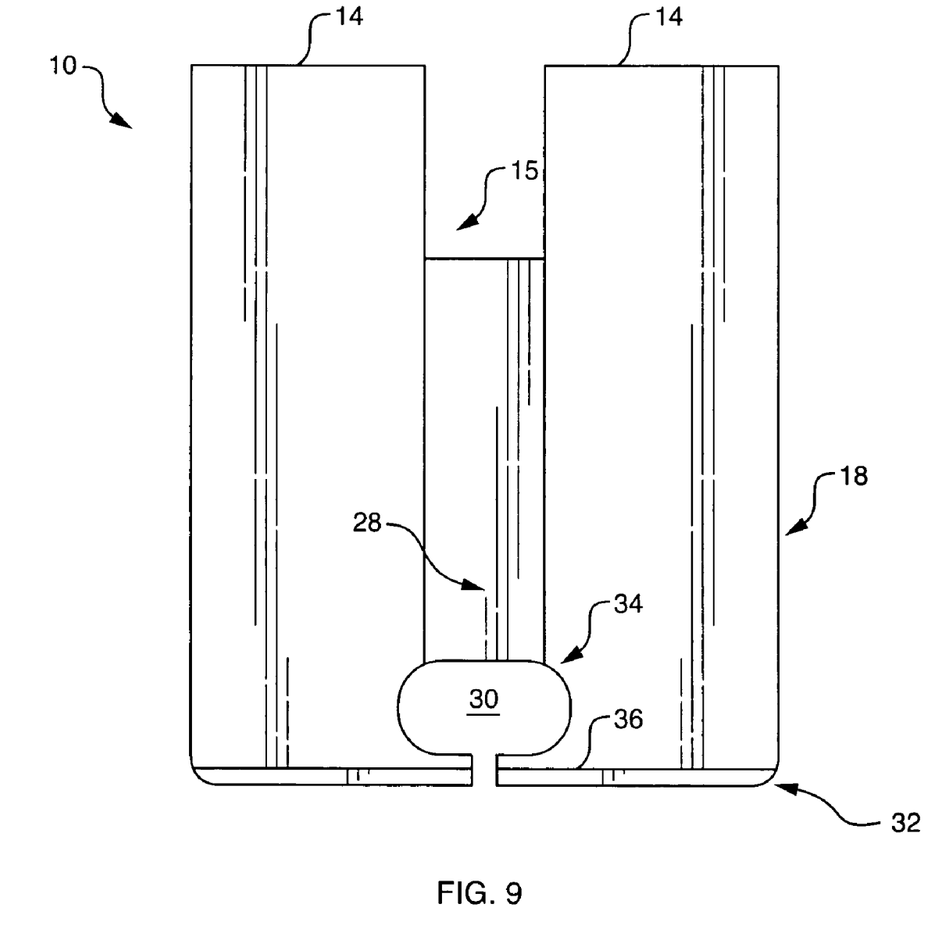
FIG. 9 is a plan view of the end of one embodiment according to the present invention.
Figure 10:
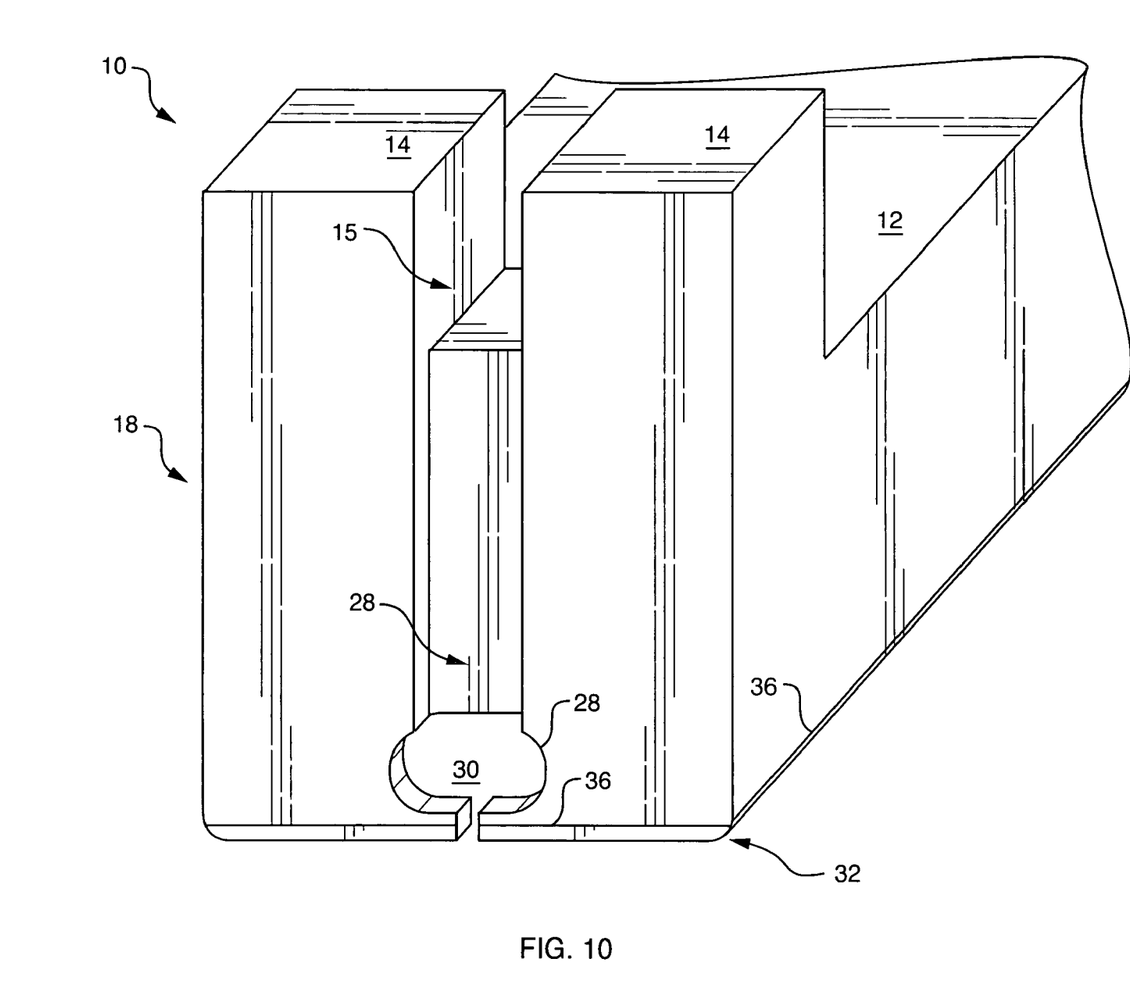
FIG. 10 is yet another perspective end view of yet another embodiment according to the present invention.

In an alternative embodiment, the carrier 10, FIGS. 9 and 10, includes hollow space or cavity 34 running along the length of the bottom surface 32. The hollow space or cavity 34 is sized to fit over a factory or aftermarket automobile roof rack (not shown) that is commonly installed on many vehicles. The hollow space or cavity 34 further aids in securing the carrier 10 to the automobile roof.

The bottom 32, FIGS. 4–10, of the carrier 10 preferably includes a high traction surface 36, such as a non-skid laminate, which is soft and does not scratch the surface of the automobile roof. The high traction surface 36 helps secure the carrier 10 to the roof of an automobile.

Figure 11:
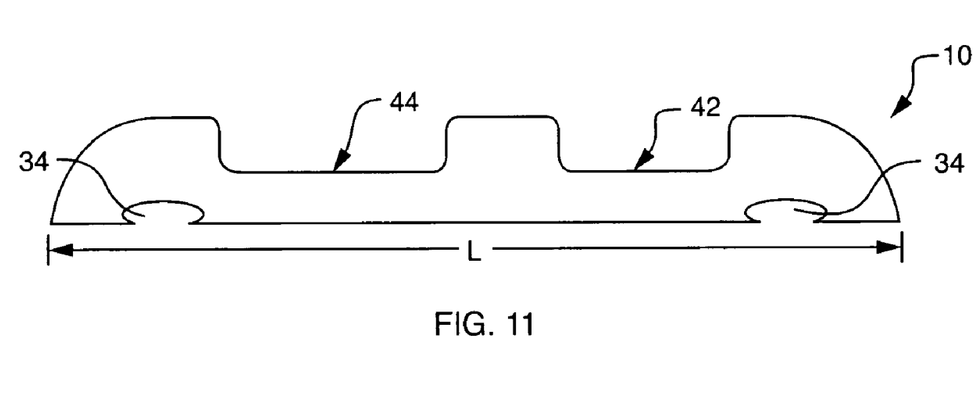
FIGS. 11 and 12 another embodiment according to the present invention.
Figure 12:
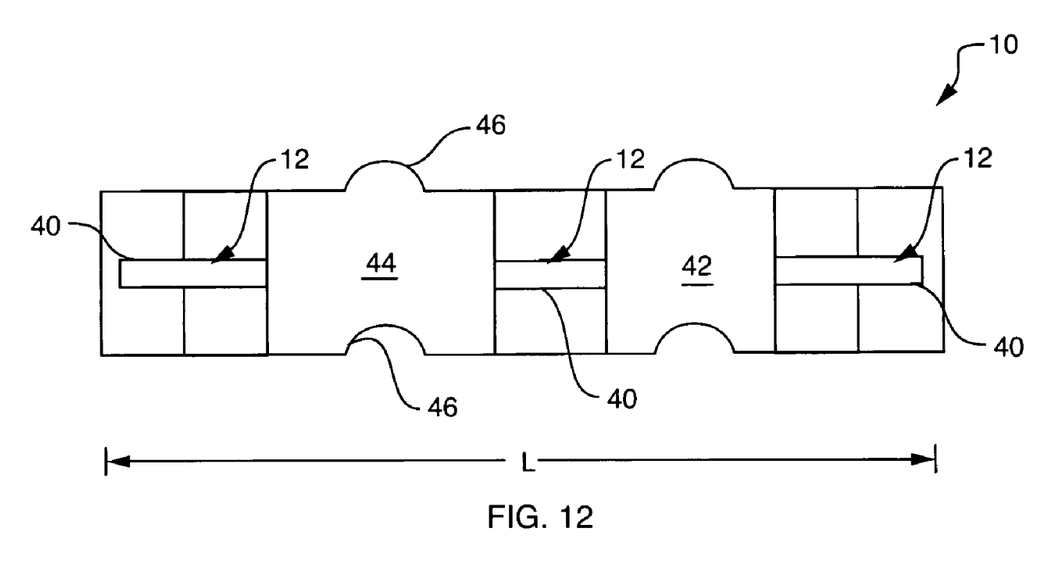
Figure 13:
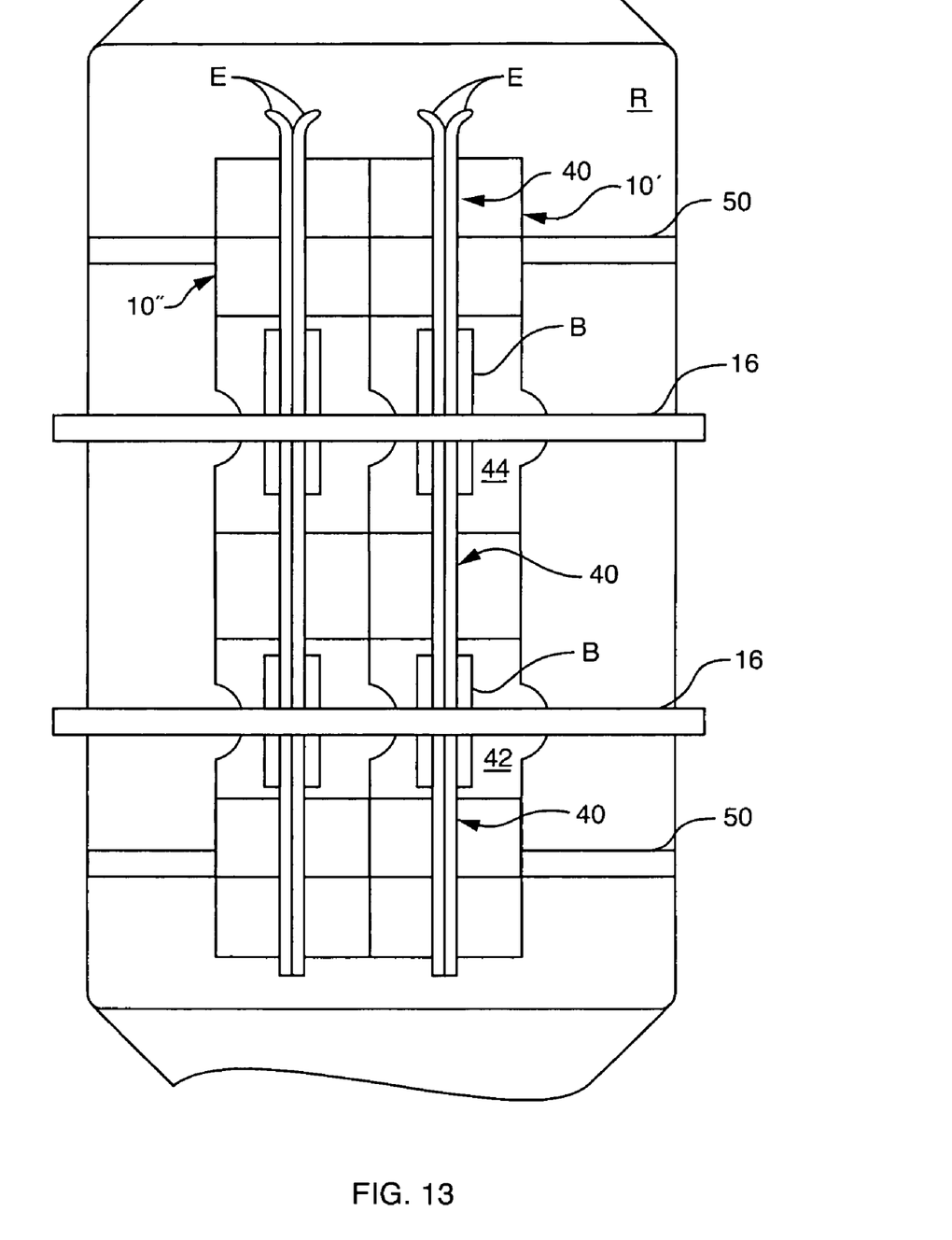
FIGS. 13 and 14 show different embodiments of the present invention installed on an automobile according to the present invention.

In yet another embodiment, the carrier 10, FIGS. 11–13, includes a longitudinal slot 40 running down the length L. The slot 40 is size to accept equipment E, such as a pair of skis. The carrier 10 also includes a first and second cavity 42, 44 sized to accept the binding B of a ski or snowboard. In a preferred embodiment, the carrier 10 also includes an interconnecting device 46, such as a "lock and key" or groove and tab, which facilitates the use of two or more carriers 10 as shown in FIG. 13. The carrier 10 may also include a hollow space or cavity 34 sized to fit over an automobile roof rack 50 that is commonly installed on many vehicles. The hollow space or cavity 34 further aids in securing the carrier 10 to the automobile roof.

Figure 14:
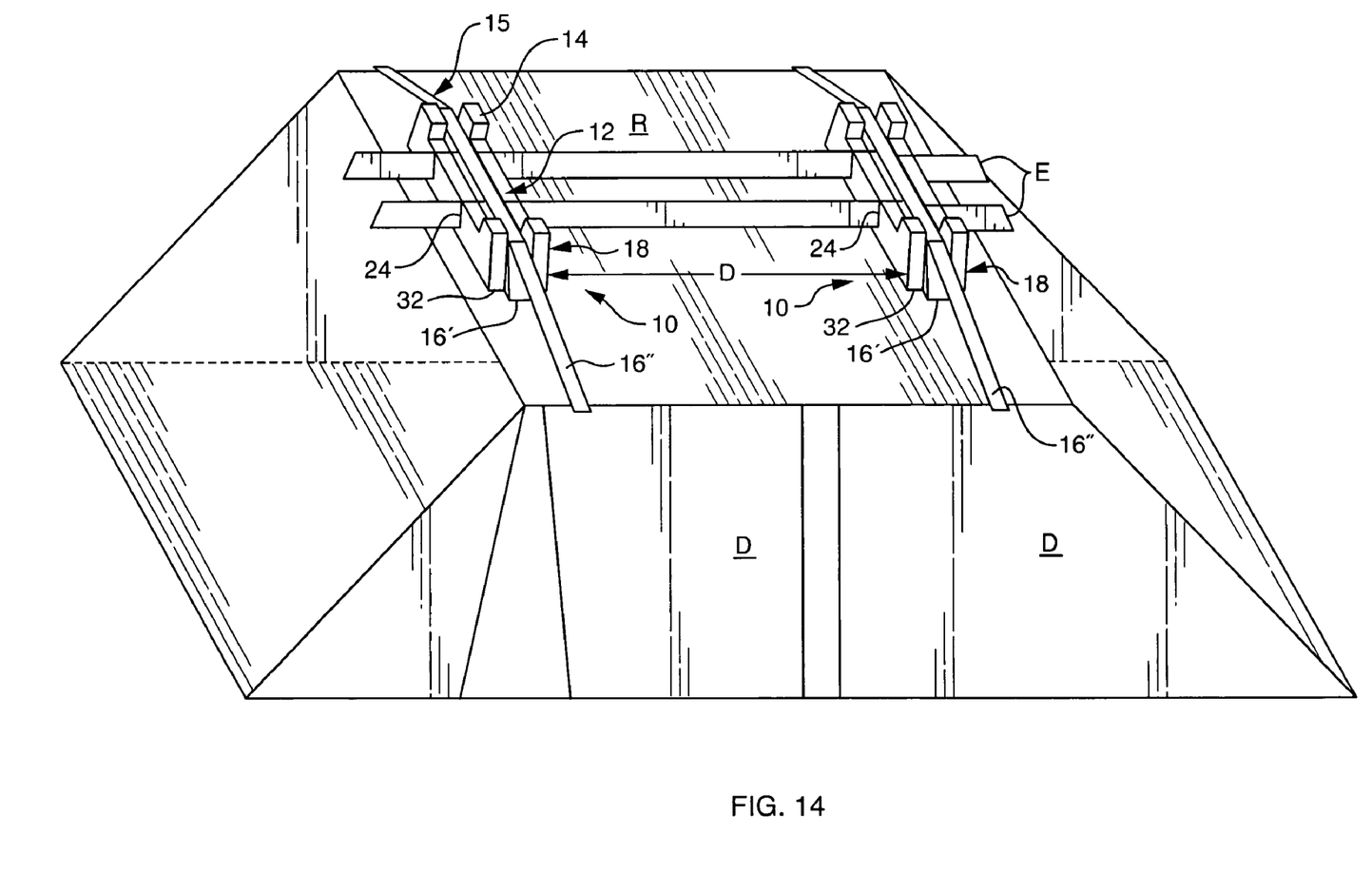

According to one method of using the carrier 10, at least one, preferably two or more, carriers 10, FIGS. 13 and 14, are placed a spaced distance D apart from each other (preferably at opposite ends of the equipment E). Next, equipment E, such as one or more snowboards, snow skis, water skis, kayaks, or surfboards, are then placed on the supporting surface 12 and/or placed in a slot 24, 40. In a first embodiment, a first strap 16' is placed around the equipment E, through the channel 15 formed by the towers 14, and around the sides 18 and bottom 32 of the carrier 10. In the preferred embodiment, the strap 16' is preferably placed through second and third channels 28, 30 as well. The strap 16' is then tightened to secure the equipment E to the carriers 10.

The carriers 10 can then be used to store the equipment E in while not in use, transport the equipment by hand, or secured the equipment E to a roof R of an automobile for long distance transportation. When securing an automobile roof R, the carriers 10 and equipment E are placed on the roof R. If a roof rack 50 is present. FIG. 13, the carriers 10 preferably include a hollow cavity 34 that allows the carriers 10 to be placed over the roof rack 50. Otherwise, the carriers 10 are placed directly on the roof R. The carriers 10 are then secured to the roof R using a second strap 16". In the preferred embodiment, the second strap 16" is placed through the doors D of the automobile, though other methods of securing the carriers 10 to the automobile are also envisioned, such as, but not limited to, securing the carriers 10 to the roof rack or to roof mounting devices. The high traction surface 36 provides an additional, soft, yet secure surface for the carriers 10 to grip the roof R. In this manner, the carriers 10 can be easy installed on any automobile.

In a second embodiment, at least one carrier 10, preferably two or more, is placed directly on the roof R. Next, the equipment E is placed on the supporting surface 12 and/or placed in a slot 24, 40. A strap 16 is then placed around the equipment E is secured to the automobile in any manner described above. In the preferred embodiment, the strap 16 is also placed through the first channel 15.

Upon arrival at the destination, the user then simply removes the equipment E from the roof R by removing the strap 16". In the preferred embodiment, the first strap 16' secures the equipment E to the carriers 10 themselves, thus enabling the user to easily transport the equipment E and carriers 10 by hand since the carriers 10 will keep the equipment E in an easily manageable package. Furthermore, the use of the first strap 16' enables the carriers 10 to function as a storage device, thus allowing the user to remove the equipment E from the roof R and quickly and easily stored the equipment E while not in use (such as during the off-season) without having to purchase a separate storage device. If only a single strap 16" is used, the equipment E can be removed directly from the carriers 10, thus allowing immediate access to the equipment E.

Modifications and substitutions by one of ordinary skill in the art are considered to be within the scope of the present invention.

The invention claimed is:

1. A carrier comprising a body of resilient material, said body including:
   a roof engagement surface disposed about at least a portion of a bottom of said body for engaging a vehicle roof and/or roof rack on which said carrier is to be mounted;
   a plurality of raised protrusions disposed about a top of said body defining a support surface sized and shaped to engage a piece of equipment, said plurality of raised protrusions defining a first and at least a second groove disposed substantially transverse to said support surface, said first and said second groove sized and shaped to engage a first fastener; and
   a third and at least a fourth groove disposed about at least a portion of a first and at least a second side portion of said body, respectively, said third and fourth groove sized and shaped to engage at least a second fastener, wherein said second fastener is disposed around at least part of said body through at least said third and said fourth groove and over said piece of equipment such that said second fastener secures said piece of equipment to said carrier block and wherein said first fastener is disposed about at least a portion of said top surface of said body through said first and second channel such that said first fastener secures said carrier to said vehicle roof and said plurality of protrusions prevents said first fastener from sliding relative to said carrier.

2. The carrier as claimed in claim 1 wherein said roof engagement surface further includes a high traction material.

3. The carrier as claimed in claim 1 wherein said support surface further includes a slot disposed substantially perpendicular to said support surface, said slot sized and shaped to contain at least part of said piece of equipment.

4. The carrier as claimed in claim 3 wherein said slot further includes a cavity disposed at an end opposite said support surface.

5. The carrier as claimed in claim 1 wherein said third and said fourth groove are aligned with said first and said second groove.

6. The carrier as claimed in claim 5 wherein said bottom surface further includes at least a fifth groove disposed longitudinally and aligned with said third and fourth groove, said fifth groove sized and shaped to accept said second fastener.

7. The carrier as claimed in claim 6 wherein said bottom surface further includes a first cavity disposed longitudinally, said cavity sized and shaped to engage at least part of a roof rack on said vehicle roof.

* * * * *